3,465,017
PREPARATION OF TRIPHENYL (BIPHENYLYL) SILANES
Robert W. Coutant, Gahanna, Ohio, assignor to the United States of America as represented by the Secretary of the Air Force
No Drawing. Filed Apr. 24, 1967, Ser. No. 634,063
Int. Cl. C07f 7/08
U.S. Cl. 260—448.2     3 Claims

ABSTRACT OF THE DISCLOSURE

A method for preparing triphenyl (biphenylyl) silane which involves the step of effecting a reaction by heating a mixture of benzil and tetraphenyl silane within an appropriate reaction vessel at a temperature and for a period of time sufficient to effect the reaction.

---

This invention relates to arylated silanes and, more particularly, to a novel process for preparing triphenyl (biphenylyl) silane. Arylated silanes, such as tetraphenyl silanes, phenylmethyl silanes and triphenyl (biphenylyl) silanes, find particular utility as lubricants because of their relatively high thermal and oxidative stability. Several methods for preparing these materials have been disclosed by the prior art. For example, one method of preparation includes the reaction of an organic halide and a silicon halide. Other methods involve the reaction of an organometallic compound with a halosilane compound. Grignard reagents are also utilized in the preparation of these compounds and give good distribution of the organic groups on the silicon atom. Wurtz-type reactions are also employed. However, the methods suggested by the prior art have not proved especially efficient in producing arylated silanes in high yield.

Arylated silanes, such as the triphenyl (biphenylyl) silanes in particular, have not been produced in any appreciable yield by utilizing the reaction mechanisms suggested heretofore. When an alkali metal is utilized, the reaction is extremely difficult to control and, under the conditions employed, the alkali metal sometimes reacts with the halogens on the silicon, producing silicon-to-silicon bonding, or the alkali metal may attack the organic halide at the point where the halogen is attacked, producing Wurtz-type carbon-to-carbon coupling instead of a carbon-to-silicon bond. These and other complicated factors often occur when the carbon-to-silicon bonding is desired. A completely satisfactory overall method for preparing triphenyl (biphenylyl) silanes is not presently available, especially a method capable of producing this material in an economic and simple manner with relatively high yields.

The primary object of this invention, therefore, is to provide a method for producing arylated silanes having all four valences of the silicon atom attached through carbon-to-monovalent organic radicals.

A further object of this invention is to provide a simple and economical process for producing triphenyl (biphenylyl) silanes.

Still another object of this invention is the preparation of triphenyl (biphenylyl) silanes in relatively higher yields than heretofore available.

The above and still further objects and advantages will become apparent upon consideration of the following description of the invention.

In general, the above-defined objects of this invention are accomplished by a novel process that effects a reaction between a mixture of compounds consisting essentially of benzil and tetraphenyl silane.

Benzil is a well-known source of phenyl radicals and, as a consequence, it seems probable that the reaction effected by the process of this invention involves a free radical mechanism. The reaction is carried out using both standard sealed vial and flow techniques.

The following example more clearly illustrates the process of this invention and points out that triphenyl (biphenylyl) silanes can be prepared in higher yields than heretofore achieved.

Example

In an evacuated, sealed vial having a volume of 47 cc., $8.9 \times 10^{-5}$ moles of benzil and $4.44 \times 10^{-4}$ moles of tetraphenyl silane were heated to about 448° C. and maintained at that temperature for about 100 minutes. Chromatographic analysis of the reaction products showed approximately of 60% yield of triphenyl (biphenylyl) silane with the ortho-, meta-, and para-isomers in a ratio of approximately 1:4:2. The analysis was carried out in a 6 foot x ¼ inch stainless steel column packed with five percent SE–30 on Anachrom-A B S. Retention times at 225° C. and a helium flow rate of 100 cc. per minute were 7, 10, 38 and 57 minutes, respectively, for tetraphenyl silane, triphenyl-o-biphenylyl silane, triphenyl-m-biphenylyl silane, and triphenyl-p-biphenylyl silane. Certification of the identities of these materials was further made by means of infrared spectroscopy and mass spectrometry.

As can be seen by an examination of the foregoing, the present invention provides a simple and economical method for producing triphenyl (biphenylyl) silanes in relatively higher yields than heretofore obtained. This compound belongs to a class of compounds having high heat, radiation and chemical stability. They are particularly useful as lubricants and hydraulic fluids. The compound produced by the method of this invention maintains its fluidity over a wide temperature range, including abnormally high and low temperatures. It is relatively chemically inert, exhibits high temperature stability, excellent lubricating properties, high electrical resistance, and is not particularly subject to oxidative degradation. Because of these properties, these compounds find special use as a high temperature lubricant, low to high temperature hydraulic fluids, dielectrics and inert liquids.

Having thus described the process of the present invention, it is not intended that it be limited except as specified in the following claims.

I claim:
1. A process for preparing triphenyl (biphenylyl) silane comprising the steps of heating a mixture of reaction components, said components consisting essentially of tetraphenyl silane and benzil, maintaining the said mixture at a temperature and for a period of time sufficient to effect a reaction between the said components, and isolating the product of said reaction.
2. A process in accordance with claim 1, wherein said mixture is heated to a temperature of about 448° C.
3. A process in accordance with claim 2, wherein said temperature is maintained for about 100 minutes.

References Cited

Gilman et al.: J.O.C., 20, pp. 862–70, 1955.
Gilman et al.: C.A., 51, p. 17790, 1957.
Spiacter et al.: C.A., 50, p. 8500, 1956.
Anderson et al.: C.A., 54, p. 6605, 1960.

TOBIAS E. LEVOW, Primary Examiner

P. F. SHAVER, Assistant Examiner

U.S. Cl. X.R.

252—49.6, 63.7, 78